J. V. ROBINSON.

AUTOMATIC TRAIN PIPE CONNECTOR.

APPLICATION FILED OCT 31, 1919.

Reissued June 1, 1920.

14,873.

4 SHEETS—SHEET 1.

Inventor

Joseph V. Robinson,

By Foster, Freeman, Watson & Coit,

Attorneys.

J. V. ROBINSON.

AUTOMATIC TRAIN PIPE CONNECTOR.

APPLICATION FILED OCT. 31, 1919.

Reissued June 1, 1920.

14,873.

4 SHEETS—SHEET 2.

Inventor

Joseph V. Robinson,

By Foster, Freeman, Watson & Coit,

Attorneys

J. V. ROBINSON.

AUTOMATIC TRAIN PIPE CONNECTOR.

APPLICATION FILED OCT 31, 1919.

Reissued June 1, 1920.

14,873.

4 SHEETS—SHEET 3.

Inventor

Joseph V. Robinson,

By Foster, Freeman, Watson & Coit,

Attorneys.

J. V. ROBINSON.

AUTOMATIC TRAIN PIPE CONNECTOR.

APPLICATION FILED OCT 31, 1919.

Reissued June 1, 1920.

14,873.

4 SHEETS—SHEET 4.

Inventor

Joseph V. Robinson,

By Foster, Freeman, Watson & Coe,

Attorneys

REISSUED

UNITED STATES PATENT OFFICE.

JOSEPH V. ROBINSON, OF SANTA MONICA, CALIFORNIA, ASSIGNOR TO THE ROBINSON CONNECTOR COMPANY, OF WASHINGTON, DISTRICT OF COLUMBIA, A CORPORATION OF DELAWARE.

AUTOMATIC TRAIN-PIPE CONNECTOR.

14,873. Specification of Reissued Letters Patent. Reissued June 1, 1920.

Original No. 1,245,784, dated November 6, 1917, Serial No. 781,194, filed July 25, 1913. Application for reissue filed October 31, 1919. Serial No. 334,880.

*To all whom it may concern:*

Be it known that I, JOSEPH V. ROBINSON, a citizen of the United States, residing at Santa Monica, county of Los Angeles, State of California, formerly residing at Chevy Chase, Maryland, have invented certain new and useful Improvements in Automatic Train-Pipe Connectors, of which the following is a specification.

My invention relates to improvements in automatic train pipe connectors and aims to improve certain features of the train pipe connectors described in my earlier applications.

One of the objects of the invention is to support the connector head and the body on its base, or supporting bracket, so that there will be the minimum of resistance to free universal movement of the head when connected to a mating head, thus insuring a perfect connection between the heads and preventing them from opening up or rocking one upon the other under the sharp whipping motion of service as when the cars round a curve or run over uneven track.

Another object of my invention is to support the connector head with the minimum resistance to universal movement as aforesaid, and project it longitudinally of the car by a force the resistance of which to such longitudinal movement will increase in greater progress than the extent of such movement of the head, thus effectually avoiding undue shocks and strains upon the head.

Still other objects and novel features of my invention will be apparent from the following description taken in connection with the drawings, in which.

Figure 1:
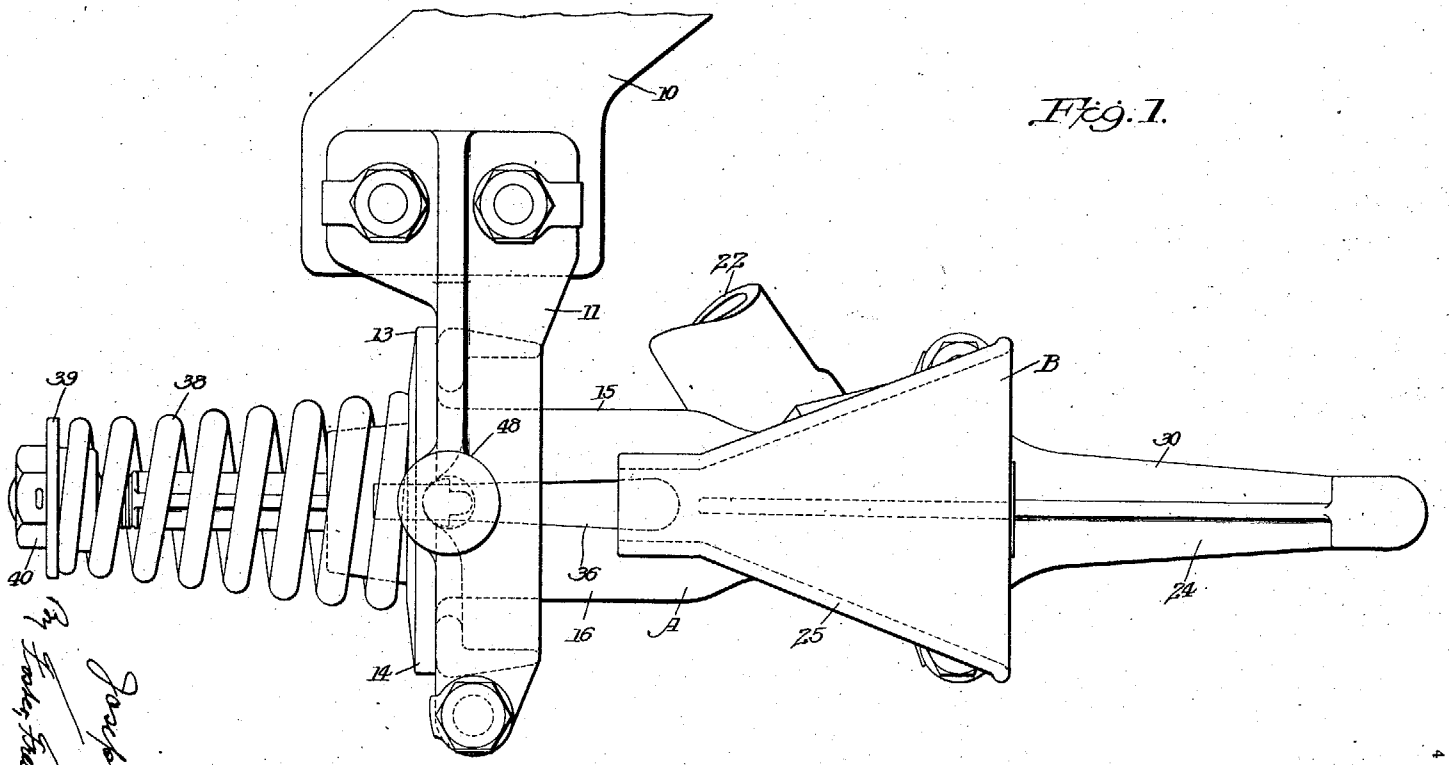
Figure 1 is a side elevation of the connector.
Figure 2:
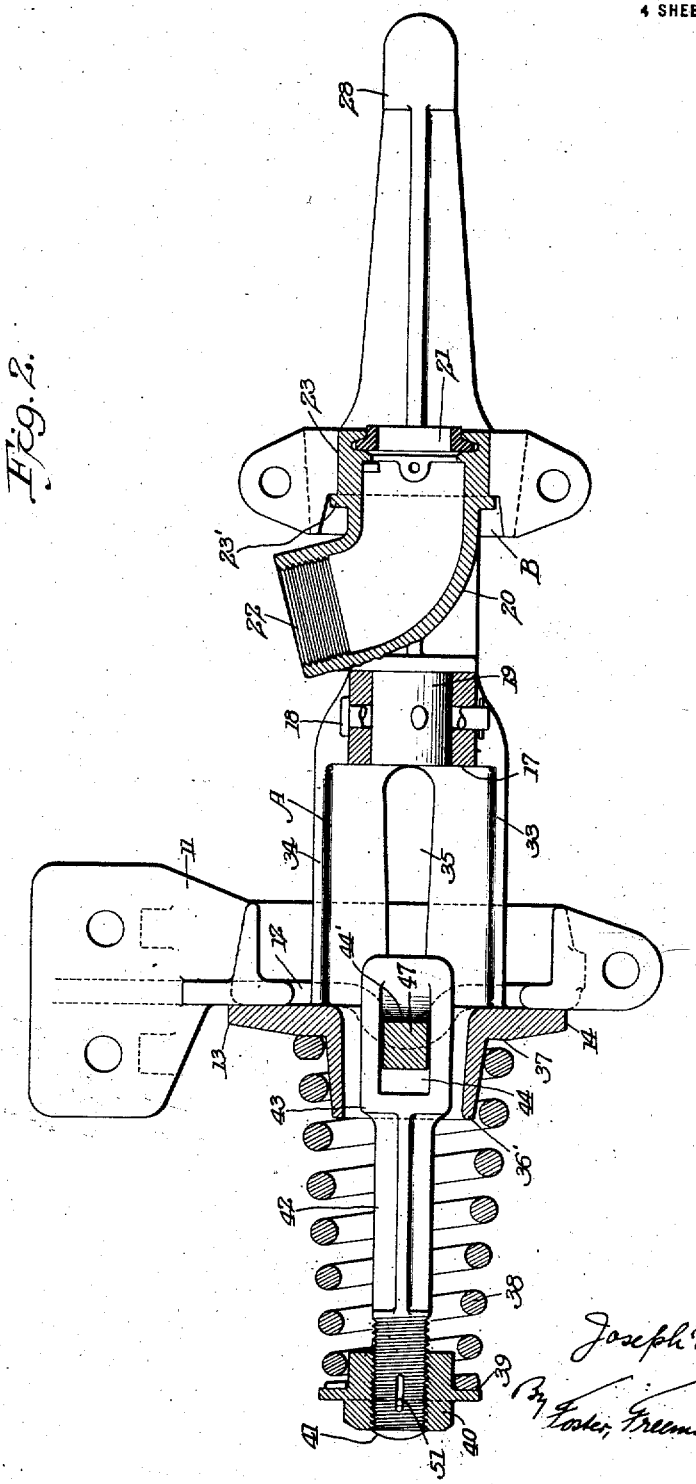
Fig. 2 is a vertical longitudinal section of the same with the pipe connection turned partially to show in section.

Referring to the drawings, 10 designates a hanger or part which is permanently connected to the car coupler of the car. A bracket or base 11 is bolted to the part 10 and comprises two similar halves which when bolted to the hanger 10 form a loose fitting collar surrounding the body of the connector, 12 designating the opening in the base 11 through which the body of the connector extends. The rear face of the base 11 is flat and forms a bearing or abutment for flanges or projections 13, 14, cast integral with the connector body. The body comprises a hollow member or casting A sloted at 33, 34, 35 and 36 and cast integral with the oppositely disposed projections 13 and 14, which constitute a partial flange at the rear of the body or member A. It will be noted that the upper flange 13 is longer than the lower one. This is in order to render the resistance of the supports in the vertical plane uniform when one car is higher than the adjacent one. In coupling under vertical disalinement, the higher connector is required to lift the lower one and the weight of the head of the higher connector tends to force it downward, whereas the weight of the head on the lower connector tends to hold it down. This causes the higher connector to drop more than the lower one raises when coupling under these conditions, and consequently the heads tend to jam or cramp. To overcome this objection, the upper flange 13 is made of greater length than the lower one, so that the higher connector is stiffened against movement downwardly in the vertical plane sufficiently to equal the resistance of the lower connector in moving upwardly in the vertical plane. At its forward end the body A is provided with a hub 17 which has holes drilled in diametrically opposite sides thereof to receive a pin 18. The pin 18 passing through the holes in the hub 17 is for the purpose of attaching the shank 19 to the body, the shank being constructed so as to fit into the hub 17 and being provided with holes to receive the pin 18. This arrangement produces a construction in which the connector head B and the shank 19 with its nipple 20 may be readily removed from the hub 17. The head of the connector comprises a fitting or nipple 20 to which the shank 19 is integrally connected, the forward end of the fitting 20 having a port opening 21 therein which is provided with a suitable gasket which projects slightly beyond the face of the connector head. The fitting 20 leads out to the side of the connector head and is provided with threads 22 to attach other fittings, pipes, or hose connections to lead air or steam from the train line to the fitting.

To bring the corresponding ports of two mating connector heads into register, gathering means are mounted at the forward end 23 of the fitting 20. In the present instance, I have disclosed the pin and funnel type of gathering device, but it is to be understood that the fitting 20 may also be equipped with other forms of gathering devices. A pin 24 and a funnel 25 are supported on the extension 23 and on opposite sides of the port 21 and these constitute the head B of the connector. The pin and funnel device comprises two separate castings, the pin 24 being formed with two ears 26 at its inner end while the funnel is also a separate casting and formed with two ears 27 at opposite sides of its inner end, the two castings having coöperating recesses on their abutting faces and between the ears so that when the castings are secured together at the ears, the recesses form a circular opening to receive and clamp the end 23 of the fitting 20, which end 23 extends through said opening and flush with the face of the connector head. There is also a groove formed at the interior of the circular opening to receive the bead 23′ on the fitting 20, whereby the gathering pin and funnel members are secured to the forward end of the connector in a convenient manner and a gathering device is provided which may be readily removed and parts replaced if one or the other of the members comprising the same breaks or is worn out. The pins 23″, of unequal diameters, fit into corresponding holes in the gathering pin and funnel member and prevent incorrect assembly of these latter parts on the end 23 of the fitting 20.

Figure 3:
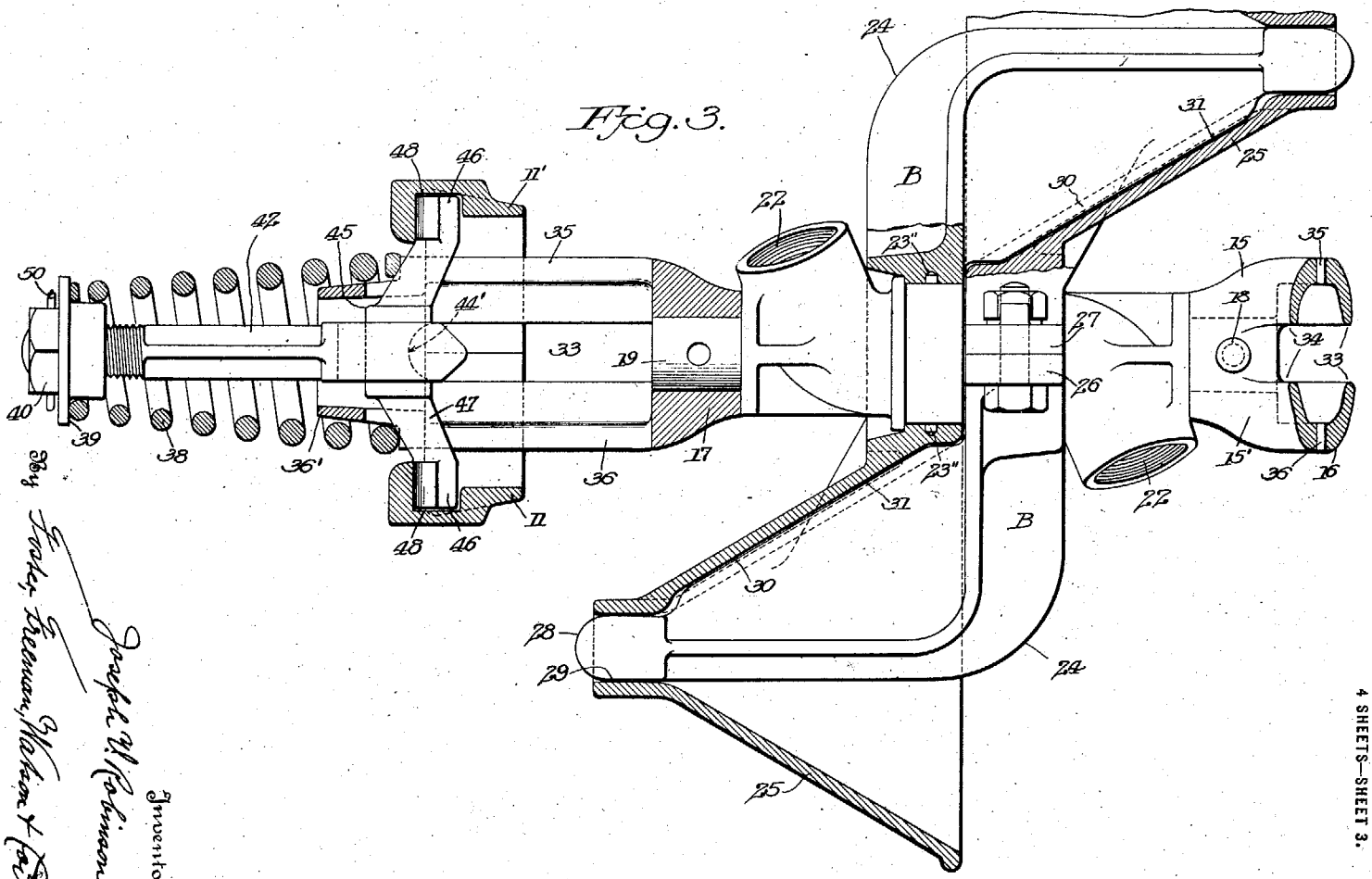
Fig. 3 is a horizontal longitudinal section of the same, the parts on a mating connector being shown in plan.
Figure 4:
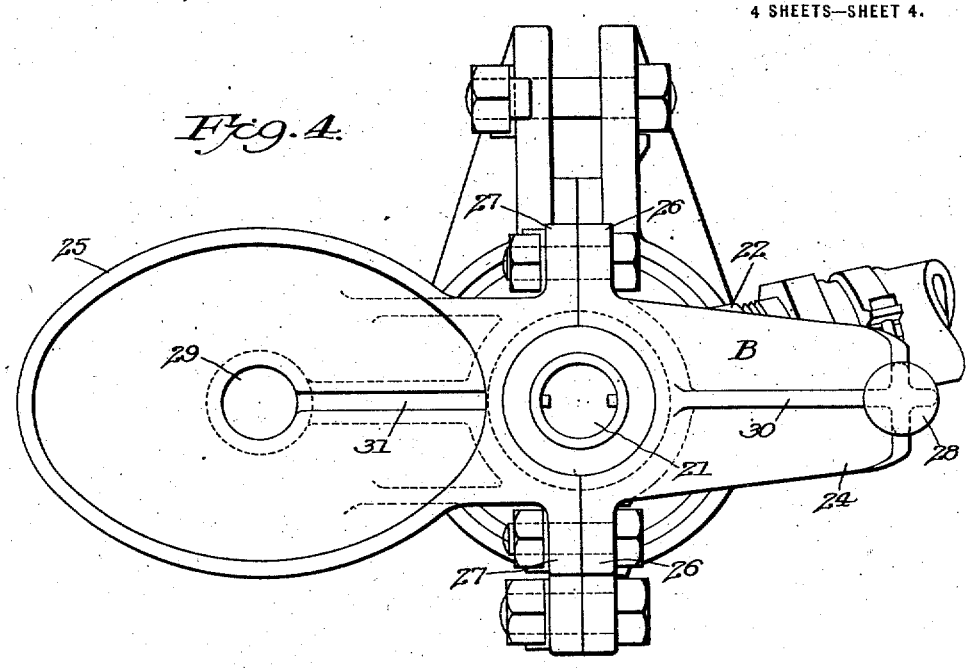
Fig. 4 is a front elevation of the connector.
Figure 5:
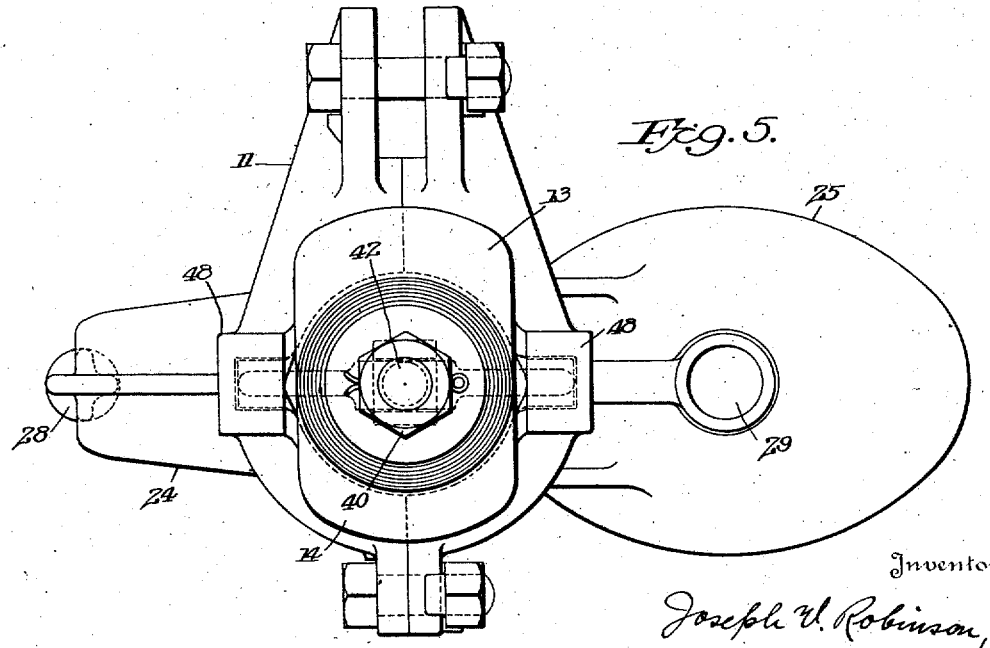
Fig. 5 is a rear elevation of the same.

The pin 24 comprises a curved arm substantially L-shaped as shown in Fig. 3 and is provided with a head 28 at its outer end to fit a recess 29 at the apex of the funnel 25. On the side of the pin 24 nearest the connector body and extending from the head 28 and to the base of the pin, there is a reinforcing web 30 which is adapted to register with and fit a corresponding groove 31 extending longitudinally of the inclined wall of the funnel 25 and located between the recess 29 and the port opening 21. Ordinarily in the gathering device the strains are local, being confined to regions where the head of the pin 28 engages the recess 29 of the funnel. By providing one member with a long groove and the coöperating member on the mating head with a long rib to fit the groove, localization of strains at the interlocking sections of the pin and funnel are avoided and any strains tending to produce angular movement between the heads are distributed through the full length of the interlock formed by the web and groove, thereby preventing damage to the pin where the same interlocks with the apex of the funnel.

The oppositely disposed slots 33 and 34 in the connector body A extend from the rear edge of the hub 17 to the forward faces of the projections 13 and 14. The slots 35 and 36 in the body start at the rear edge of the hub and taper rearwardly of the body to slightly beyond the partial flange formed by the projections 13 and 14.

The rear end of the body A beyond the flange formed by the projections 13 and 14, is provided with a neck 36′ and where the neck joins the projections 13 and 14 there is an annular seat 37 for the base end of a conical spring 38, which is coiled of a tapered bar. The spring tapers rearwardly and the bar comprising the same is of smaller diameter at its rear end, where it bears against a seat or shoulder 39 on an adjustable nut 40, than it is at its larger end. This construction produces means for resisting longitudinal movement of the connector head with a force which increases in greater proportion than the extent of such movement since each coil of the spring will yield and offer a resistance in proportion to its thickness, the lighter coils yielding first and the larger ones following.

The nut 40 is internally threaded to receive the threads 41 on the outer end of a rod or member 42 which at its forward end has a longitudinal flattened part 43. The flattened part 43 has a transverse oblong opening 44 extending therethrough, the opening 44 having a curved or cylindrical inner wall 44′ to form a seat to fit a complementary bearing face, on the flattened section 45 located intermediate the ends 46 of a pivot device or bar 47 as shown.

The ends 46 of the pivot bar are bent out of line with the section 45 and are rounded on their rear faces to fit bearings 48 in the base 11 on diametrically opposite sides of the opening 12 therein. One of said bearings is formed in each of the halves comprising the base 11. It will be noted that the base of the spring 38 will tend to press forwardly against the flange on the rear end of the body whereas the apex or opposite end of the spring tends to force the rod 42 rearwardly. As the rod 42 is located on the axis of the spring and body A and is pivotally anchored in the base 11, the spring when properly adjusted will normally hold the flange against the rear face of the base and thus sustain the connector at the limit of its forward movement in a comparatively rigid and normally horizontal position but so as to permit a vertical and lateral movement in all directions when the head B engages a mating connector The rod 42 it will be noted is adapted to rotate universally as respects the base 11, but only in the horizontal plane as respects the pivot bar 47 while the pivot bar 47 itself is adapted to rotate in the vertical plane only as respects the base 11.

In assembling the connector the head end of the rod 42 is passed through the neck 36′ of the body A and the yoke or pivot bar 47 is then inserted from either side through the larger end of the tapering slot 35 in the body until the flat section 45 of the pivot bar fits the oblong opening 44 whereupon the rod 42 is drawn rearwardly and the halves of the base 11 are bolted about the body with the ends 46 of the pivot bar 47 fitting in the bearings 48 of the base 11. The conical spring 38 is then passed around the rod 42 and the nut 40 is fitted on the rod 42 to suitably tension the spring and form an abutment for its outer end. The resistance of the spring and its normal compression are determined by the weight of the connector head, plus an additional resistance sufficient to prevent undue swinging of an uncoupled head when the cars are in motion.

It will be observed that by drawing up on the nut 40 the resistance of the spring against the body of the connector is varied and the movement of the connector head from its normal position is proportionately resisted, but the body and head are normally supported in a substantially horizontal position. The nut 40 is locked against rearward movement from the adjusted position by a pin 50 which passes through a slot 51 in the threaded end of the rod 42.

The operation of the connector will be clear from the foregoing description. When two cars equipped with the connector are moved into engagement the pin and funnel gathering devices on the connectors will guide the ports of the connector heads into register and any tendency for the connector heads to part angularly or rock one upon the other will be prevented by means of the rib on the pin which engages the groove in the funnel, and by reason of the interlocking connections between the members 28 and the recesses 29. The connector is so supported that it may be freely moved in any direction so as to bring the ports therein into register with the ports of opposing connectors and may be readily assembled and adjusted to suit varying conditions of service. Undue rotation of the connector head B about its longitudinal axis is prevented by the pivot bar 47 engaging the walls of the slots 35 and 36. It will be noted that the pivot bearing connection between the pivot bar 47 and the rod 42 is in the same plane as the pivot connection between the pivot bar 47 and the base 11, these two pivot connections of course being at right angles as illustrated in Fig. 3. This facilitates the vertical movement of the heads in the act of coupling and renders it unnecessary to have a wide slot in the member A.

It will be clear that various changes may be made in the construction without departing from the spirit of the invention, and therefore I do not wish to be limited to the exact details as shown and described.

Having thus described my invention, what I claim is:

1. In an automatic train pipe coupling, the combination of a coupling head, a base, a member passing through the base and carrying at one end a laterally diverging fluid conduit which extends through said head, a projection near the other end of said member, and means for normally maintaining said projection in engagement with said base to yieldingly support said coupling head.

2. In an automatic train pipe connector, the combination of a base, a body extending through the base and provided at one side of said base with a flange, a head attached to the body on the opposite side of the base, and means for yieldingly sustaining said head and body, said means comprising a member pivotally mounted on the base at one side of said body and extending rearwardly of its bearings, and a spring attached to the rear end of said member and bearing against said flange on said body.

3. In an automatic train pipe connector, the combination of a base having an opening therethrough, a connector head and body, said body extending through the opening and having an enlargement at the rear side of said opening, said enlargement forming a shoulder to abut against the base, means for maintaining the said shoulder in its abutting relation, said means comprising a bar extending across said opening and pivoted in the base, a stem extending rearwardly from said bar, and a spring confined between the rear end of said stem and the said enlargement on the body.

4. In an automatic train pipe connector, the combination of a base having an opening therethrough, a body having a shoulder abutting against the rear face of said base, and means tending to hold the shoulder in abutting relation with said rear face of the base, said means comprising a bar pivoted on the base, a stem connected to the bar, and a spring confined between the free end of said stem and the shouldered part of said body.

5. In an automatic train pipe connector, the combination of a base having an opening extending therethrough, a hollow body having openings on opposite sides thereof, said body extending through said opening in the base and having a shoulder abutting against the rear face of said base, a bar extending through said oppositely arranged openings in the said body and mounted in bearings in said base, a stem connected to said bar and extending rearwardly of the base, and a spring confined between the rear end of the stem and the shouldered part of the body.

6. In an automatic train pipe connector, the combination of a base having an opening extending therethrough, a hollow body having an opening at opposite sides thereof, said body extending through the opening in said base and being provided with a shoulder near its rear end which abuts against the rear face of said base, and means for sustaining said shoulder in its abutting relation and thereby maintaining said connector body and head in a predetermined position, said means comprising a yoke having the ends thereof extending through said opening in the sides of said body and supported in bearings in said base, a stem extending rearwardly from said yoke and having an opening through which said yoke extends, and a conical spring confined between the rear end of said stem and the shouldered part of said body and having its base bearing on said body.

7. In an automatic train pipe connector, the combination of a base having an opening extending therethrough, a hollow body having openings on the opposite sides thereof, a hub at the forward end of the body, said body extending through said opening and having a shoulder near its rear end which is adapted to abut against the rear face of said base, a connector head secured to the hub on said body, and means for maintaining the shoulder on said body in abutting relation with the base, said means comprising a yoke having the ends thereof extending through said openings in the body and pivoted in bearings in the base, a stem having an opening in the head end thereof through which said yoke extends, an abutment at the other end of said stem, and a conical spring confined between said abutment and the shouldered end of said body, substantially as described.

8. In an automatic train pipe connector, the combination with a base, of a connector body extending through the base and having a radially extending portion adapted to bear against the rear face of the base, a spring acting to hold the connector body in engagement with the base, and a coupling head having a conduit that extends through said head and to one side thereof and which is provided with a shank that extends into a socket at the forward end of the connector body.

9. In an automatic train pipe connector, the combination with a base, of a connector body extending through the base and provided with a surface adapted to contact with the base to limit movement of the body through the base in one direction, a spring acting to maintain said surface in contact with the base, a stem extending through the spring and provided with an abutment for one end thereof, and a bar connected to said stem and extending through the body into seats provided therefor in the base, for the purpose described.

10. In an automatic train pipe coupling, the combination of a coupling head, a base provided with an opening, a member extending rearwardly through said opening and provided with a projection, a spring acting against the member and tending normally to hold the projection against said base, a pivot device extending across the opening in the base and movably mounted in the walls of the latter, and a stem pivotally connected to said pivot device and extending rearwardly through said spring for maintaining the spring in position under compression.

11. In an automatic train pipe coupling, the combination of a coupling head, a base provided in its wall with a bearing, a member extending rearwardly from the head through the base and having in rear of the latter a projection, a pivot device extending from the member into said bearing in which it is adapted to oscillate, a stem movably connected with said pivot device, a spring surrounding the stem and abutting said member, and means on the stem for maintaining said spring in position to force said projection against said base.

12. In an automatic train pipe coupling, the combination of a coupling head, a base, a member extending from the head rearwardly through the base and provided in its side with an elongated slot, a projection on said member having an annular seat, a pivot device extending from within the member through said slot into engagement with the wall of the base for movement relative to the latter, a stem connected with said pivot device, a spring mounted in said seat and surrounding said stem, and means on the stem for holding said spring in position to force the projection against said base and for varying the pressure of said spring against the base.

13. In an automatic train pipe coupling, the combination of a coupling head, a member extending from said head, a two-piece base secured about said member, one piece of the base being provided with a bearing, a pivot device extending from said member into said bearing, a stem connected to said pivot device, and a spring confined between the rear end of said stem and said member for projecting the latter forwardly of said base.

14. In an automatic train pipe coupling, the combination of a coupling head, a base, a member extending from said head through said base and provided with a projection, a spring acting upon said member to hold said projection against said base, a pivot device mounted in said base and having also a seat, a stem provided with a head having an integral cylindrical portion mounted in said seat, and means on said stem for maintaining said spring under compression.

15. In an automatic train pipe coupling, the combination of a coupling head, a base provided with bearings, a member extending from said head through said base and provided with a projection, a spring acting upon said member to hold said projection against said base, a stem provided with a perforated head and having an integral cylindrical portion lying within said perforation, a pivot device having a seat and extending through the perforation of said stem into the bearings of said base with said cylindrical portion mounted in said seat, and means on said stem for maintaining said spring under compression.

16. In an automatic train pipe connector, the combination of a head, a base having oppositely disposed bearings, a device mounted in said bearings for movement about an axis, a member pivotally mounted on said device for movement in a plane substantially at a right angle to the axis about which said device moves, means extending from said head rearwardly to the rear of said base and carrying thereat a projection, and a spring acting to hold said projection in engagement with said base, said projection and base being so related as to approximately equalize the force required to move said head downwardly from normal uncoupled position with that required to move it upwardly from such position.

17. In an automatic train pipe connector, the combination of a head, a base having oppositely disposed bearings, a device mounted in said bearings for movement about an axis, a member pivotally mounted on said device for movement in a plane substantially at a right angle to the axis about which said device moves, means extending from said head rearwardly to the rear of said base and carrying thereat a projection which extends above and below the longitudinal center line of said means, and a spring acting to hold said projection in engagement with said base, that part of said projection which extends above said center line being of greater length than the part which extends below said line, for the purpose described.

18. In an automatic train pipe connector, the combination of a head, a base having oppositely disposed bearings, a device mounted in said bearings for movement about an axis, a member pivotally mounted on said device for movement in a plane substantially at a right angle to the axis about which said device moves, and means coöperating with said device and said member to support said head yieldingly against movement, said means offering a resistance which increases in greater progression than the extent of movement of said head.

19. In a train pipe connector, the combination with a depending bracket and a coupling head of means for yieldingly sustaining the head forward of the bracket comprising a pivot bar journaled in the bracket, a rod or member movable in a plane at right angles to the axis of the pivot bar, a spring surrounding said rod or member, and a part rigid with the head and normally held in contact with the bracket by said spring.

20. In a train pipe connector the combination with a depending bracket and a coupling head of means for yieldingly sustaining the head forward of the bracket comprising a pivot bar extending across an opening of the bracket, a rod or member movable in a plane at right angles to the axis of the pivot bar, a spring surrounding said rod or member, and a part rigid with the head and normally held in contact with the bracket by said spring.

21. In a train pipe connector the combination with a depending bracket and a coupling head of means for yieldingly sustaining the head forward of the bracket comprising a pivot bar turning on a horizontal axis and having its ends journaled in the bracket, a rod or member movable in a plane at right angles to the axis of the pivot bar, a spring surrounding said rod or member, and a part rigid with the head and normally held in contact with the bracket by said spring.

22. In a train pipe connector the combination with a depending bracket and a coupling head of means for yieldingly sustaining the head forward of the bracket comprising a pivot bar, bearings in the bracket to receive the pivot bar, a member movable in a plane at right angles to the axis of the pivot bar, and a spring surrounding said member and exerting tension to hold the pivot bar seated in its bearings.

23. In a train pipe connector the combination with a depending bracket and a coupling head of means for yieldingly sustaining the head forward of the bracket comprising a face at the rear of the bracket, a pivot bar mounted in bearings in the sides of the bracket, a flange connected to and movable with the head, and a spring constantly tending to press the pivot bar against its bearings and to press said flange against the rear face of the bracket.

24. In a train pipe connector the combination with a depending bracket and a coupling head of means for yieldingly sustaining the head forward of the bracket comprising a pivot bar extending transversely of the bracket and journaled in the sides thereof, said pivot bar having a transverse bearing midway of its ends, a spring abutment device seated in said transverse bearing, a flange connected to the coupling head, and a spring bearing on said abutment device and pressing said flange against the rear face of the bracket.

25. In an automatic train pipe connector, the combination with a bracket having a rear face and an opening, of a pivot bar journaled in the bracket and extending transversely of the opening, a rod or member movable in a plane at right angles to the axis of the pivot bar, a head, a part coöperating with the face to sustain the head, and a spring arranged about said rod or member and adapted to yieldingly press said part against said face.

26. In an automatic train pipe connector, the combination of a base having a rear face, a coupling head, a fluid conduit diverging laterally of said head and connected therewith and carrying a member which extends rearwardly of said head and to the rear of said base, a radially extending projection on said member and resting normally against the rear face of said base, a device carried by said base and having a cylindrically formed bearing surface located substantially on the vertically center line of said base, a member having at one end an opening through which said device extends, the forward inner wall of said member being cylindrically formed and mounted on said bearing surface of said device, an abutment at the other end of said member and to the rear of said projection, and a spring confined between said abutment and said projection for normally extending said coupling head with said projection pressed against said base.

27. In an automatic train pipe connector, the combination of a base having a rear face, a coupling head, a fluid conduit diverging laterally of said head and connected therewith and carrying a member which extends rearwardly of said head and to the rear of said base, a radially extending perforated projection on said member and resting normally against the rear face of said base, a device carried by said base and having a cylindrically formed bearing surface located substantially on the vertical center line of said base, a rod extending through said perforation and having at one end an opening through which said device extends, the forward inner wall of said rod being cylindrically formed and mounted on said bearing surface of said device, for movement in the horizontal and vertical planes relative to said base, an abutment at the other end of said rod and to the rear of said projection, and a spring confined between said abutment and said projection for normally extending said coupling head with said projection pressed against said base.

28. In an automatic train pipe connector, the combination of a base carrying a pivot device having a cylindrically formed seat, a coupling head, a fluid conduit connected with said head and diverging laterally thereof at the rear of the head, a means extending from said conduit to the rear of said base and terminating thereat in a perforated radially extending projection adapted normally to rest against the rear face of said base, a member extending through said perforation and having an eye through which said pivot device extends, said eye having a cylindrically formed bearing surface on its forward wall which normally rests on the seat of said pivot device and is adapted to oscillate thereon relative to said base, an adjustable abutment on that end of said member which extends through said perforation and to the rear thereof, and a spring confined between said abutment and said projection for extending said head with said projection normally resting against said base.

29. In an automatic train pipe connector, the combination of a base having a rear face and a bearing, a radially extending projection at the rear side of said base, a fluid conduit in front of said base, means connecting said conduit with said radially extending projection, a device pivotally mounted in the bearing on said base for movement relative to said base only, a member pivotally mounted on said device and carrying a seat to receive a spring which member and seat are adapted to move relative to said device only in a predetermined plane, a coupling head on said conduit, and a spring seated on the seat carried by said member and acting to support said head with said radially extending projection pressing against said rear face of said base.

30. In an automatic train pipe connector, the combination of a base having an opening and oppositely disposed bearings, a radially extending projection at the rear of said base, a fluid conduit, a coupling head mounted on said conduit, a member connecting said conduit and said radially extending projection, a device extending laterally of said member into the bearings in said base, a spring for extending said head and placing it under pressure, a support for said spring pivotally connected with said device, and a means for varying the pressure of said spring upon said support.

31. In an automatic train pipe connector, the combination of a coupling head, a fluid conduit connected with said head, a member on said conduit and extending rearwardly thereof and carrying at its rear end a radially extending projection, a base having walls which extend from above said member to either side thereof and carry bearings, a device extending transversely of said member into said bearings, said device being also provided with a bearing, the seat for a spring pivotally mounted in a bearing on said device, a spring mounted on said seat and acting to extend said head with said projection pressing against said base, and means for maintaining said spring in position.

32. In an automatic train pipe connector, the combination of a coupling head, a base having an opening therein, a fluid conduit connected with said head, a radially extending projection at the rear of said base and normally bearing against the base, means extending through said base and connecting said projection with said fluid conduit, a device extending across the opening in said base and terminating at either side thereof in cylindrically formed bearing ends which are pivotally mounted in the walls of said base whereby said device may rotate relative to said base, a seat on said device, a member mounted on said seat and adapted to rotate thereon, and a spring acting to maintain said member properly positioned in said seat and to extend said head with said projection normally resting against the rear face of said base.

33. In an automatic train pipe connector, the combination of a coupling head, a base having an opening therein, a fluid conduit connected with said head, a radially extending projection at the rear of said base and normally bearing against the base, a device extending across the opening in said base and terminating at either side thereof in cylindrically formed bearing ends which are pivotally mounted in the walls of said base whereby said device may rotate relative to said base, means connecting said conduit with said projection and coöperating with said device to prevent undue rotation of said coupling head about its longitudinal axis.

34. In a train pipe connector the combination with a depending bracket having laterally spaced bearings and a coupling head, of means for yieldingly sustaining the head forward of the bracket comprising a pivot bar having its ends mounted in said bearings, said pivot bar being offset rearwardly and having a central bearing surface in line with its end bearings, a member having at one end a bearing coöperating with said central bearing surface and at its upper end an abutment for the rear end of a spring, a spring surrounding said member and a flange connected with the coupling head against which the forward end of said spring bears, said flange coöperating with the bracket to sustain the coupling head in coupling position.

JOSEPH V. ROBINSON.

Witnesses:
JAMES A. WATSON,
ROBERT C. WATSON.